(12) United States Patent
Govindarajalu (10) Patent No.: US 7,412,475 B1
(45) Date of Patent: Aug. 12, 2008

(54) ERROR DETECTING ARITHMETIC CIRCUITS USING HEXADECIMAL DIGITAL ROOTS

(75) Inventor: Hariprakash Govindarajalu, Thirubuvanam (IN)

(73) Assignee: Sun Microsystems, Inc., Santa Clara, CA (US)

( * ) Notice: Subject to any disclaimer, the term of this patent is extended or adjusted under 35 U.S.C. 154(b) by 827 days.

(21) Appl. No.: 10/807,483

(22) Filed: Mar. 23, 2004

(51) Int. Cl.
*G06F 11/00* (2006.01)
(52) U.S. Cl. .................................................. 708/530
(58) Field of Classification Search .................. 708/530
See application file for complete search history.

(56) References Cited

OTHER PUBLICATIONS

B. Parhami, "A Note on Digital Filter Implementation Using Hybrid RNS-Binary Arithmetic," Signal Processing, vol. 51, No. 1, pp. 65-67, 1996.

B. Parhami, "RNS Representations with Redundant Residues," Proc. of the 35th Asilomar Conf. on Signals, Systems, and Computers, Pacific Grove, CA, pp. 1651-1655, Nov. 4-7, 2001.

M. J. Flynn, *EE 486 Lecture 4: Residue Arithmetic*, Jan. 14, 2003, available at http://www.stanford.edu/class/ee486/doc/lecture4.pdf, (last visited Jun. 2, 2004).

*Primary Examiner*—David H Malzahn
(74) *Attorney, Agent, or Firm*—Chapin IP Law, LLC (57) ABSTRACT

Embodiments of the invention are directed to circuits and techniques for computer processor register integrity checking employing digital roots, and hexadecimal digital roots (HDRs) in particular, to validate the results of arithmetic operations and register moves. These circuits thus provide extra confidence that register operations were correctly executed. A hexadecimal digital root is computed for the result of each register computation and compared to the results of the same computation performed on the HDRs of the operands. The hexadecimal digital root approach may be simply implemented with standard combinatoric logic. Validation is accomplished in a single clock cycle so that there is no added system delay or latency. The circuits and methods described herein have comparatively little impact on processor real estate.

21 Claims, 5 Drawing Sheets

Fig. 5A
Truth Table

```
 Inputs      Outputs
S1C1 S0C0   B1 B2 B3 B4
----------  -----------
 0 0  0 0    0  0  0  0
 0 0  0 1    0  1  0  0
 0 0  1 0    1  0  0  0
 0̶ 0̶  1̶ 1̶

0 1  0 0    0  1  0  0
 0 1  0 1    0  0  1  0
 0 1  1 0    1  1  0  0
 0̶ 1̶  1̶ 1̶

1 0  0 0    1  0  0  0
 1 0  0 1    1  1  0  0
 1 0  1 0    0  1  0  0
 1̶ 0̶  1̶ 1̶

1̶ 1̶  0̶ 0̶
 1̶ 1̶  0̶ 1̶
 1̶ 1̶  1̶ 0̶
 1̶ 1̶  1̶ 1̶
```

Fig. 5C $B1 = S0\overline{S1} + S1\overline{S0} = S0 \oplus S1$ $B2 = \overline{C1}C0 + C1\overline{C0} + S1S0 = C1 \oplus C0 + S1S0$ $B3 = C0C1$ $B4 = 0$

| | $\overline{S0C0}$ | $\overline{S0}C0$ | S0C0 | $S0\overline{C0}$ |
|---|---|---|---|---|
| $\overline{S1C1}$ | 0 | 0 | X | 1 |
| $\overline{S1}C1$ | 0 | 0 | X | 1 |
| S1C1 | X | X | X | X |
| $S1\overline{C1}$ | 1 | 1 | X | 0 |

B2:

| | $\overline{S0C0}$ | $\overline{S0}C0$ | S0C0 | $S0\overline{C0}$ |
|---|---|---|---|---|
| $\overline{S1C1}$ | 0 | 1 | X | 0 |
| $\overline{S1}C1$ | 1 | 0 | X | 1 |
| S1C1 | X | X | X | X |
| $S1\overline{C1}$ | 0 | 1 | X | 1 |

B3:

| | $\overline{S0C0}$ | $\overline{S0}C0$ | S0C0 | $S0\overline{C0}$ |
|---|---|---|---|---|
| $\overline{S1C1}$ | 0 | 0 | X | 0 |
| $\overline{S1}C1$ | 0 | 1 | X | 0 |
| S1C1 | X | X | X | X |
| $S1\overline{C1}$ | 0 | 0 | X | 0 |

ERROR DETECTING ARITHMETIC CIRCUITS USING HEXADECIMAL DIGITAL ROOTS

BACKGROUND

In modern computer processors, arithmetic units (sometimes also known as arithmetic logic units or ALUs) contain registers and other memory elements that are used to store operands during computations. Conventional arithmetic units include, but are not limited to, integer adders and multipliers as well as floating point units. Typical arithmetic unit operations include addition, subtraction, fixed point multiplying and divide, and floating point computations. Modern processors may also include other on-board (on-chip) memory storage elements, such as RAM, ROM, and PROM. Typical off-board memory, including disk drives and other forms of mass memory storage well known in the art, communicate with the processor by means of conventional circuits.

In operation, the processor fetches operands (i.e., data values that are to be operated upon) from memory, which may be located in any of the above devices, both on-chip and off-chip. The processor loads the fetched operands into a register (or perhaps several registers, depending on processor architecture and the length of the operands) and then performs the appointed operation on them under conventional software control, e.g., via execution of instructions from microcode or RAM in accordance with the processor's control systems.

For example, in a simple addition of operands A and B, where the value A is stored in memory location 001 and the value B is stored in memory location 002, the addition operation begins by fetching A into a first register and B into a second register. When the software controlling the processor is ready to add these two values, it causes the contents of the two registers to be loaded into an adder (in a typical processor) and added together. The processor typically returns the result of the adding to the first register, although in some architectures it may be directed to another register.

One particular error detection method used for mental calculation verification employs digital roots to check integer addition. A conventional digital root (DR) consists of a recursive sum of the digits of a particular number. For example, if integer X is 2298, the digital root of X is $2+2+9+8=21$. Recursively adding $2+1$ yields 3, which is the DR of 2298. Error detection is achieved by employing the fact that the sum of the digital roots of two numbers A and B is equal to the digital root of the sum of A and B. Thus, one may determine whether the addition of two numbers is correct by adding the DRs of the operands and comparing that sum to the DR of the result of the original addition operation. The same approach may also be used to verify the results of multiplication or division, since the DR of the product of two numbers equals the digital root of the product of the two original numbers' DRs.

Digital roots may also be used to verify the accuracy of a subtraction operation. Conventional subtraction may be performed adding the 10's complement of the subtrahend (the "Y" in "X−Y") and discarding the carry of the result. In order to verify subtraction using digital roots, one computes the digital roots of the operands (using the 10's complement of the subtrahend) and compares the result of the addition of the digital roots (including the carry) to the digital root of the result of the original subtraction. For example, if X=2298 and Y=1346, to compute X−Y, one takes 2298+(the 10's complement of 1346)=2298+8654=952, discarding the carry. The digital root of X equals $2+2+9+8=21=>3$. The digital root of the tens complement of Y equals $8+6+5+4=23=>5$. The sum of these digital roots is $5+3=8$. Comparing this to the result of the original subtraction operation including the discarded carry, one sees that the digital root of the result equals $9+5+2+\text{carry } 1=17=>8$.

In computer systems where data integrity and error-free (or, at a minimum, fault-tolerant) computation is desired, processor designers employ various other schemes for error detection and correction to ensure that bad data is not propagated through the system. Such systems include error detection schemes such as parity bit checking, checksums, error correcting codes (ECC), Hamming codes, Gray codes, and the like. The schemes are typically employed on data stored on disk drives or in RAM or ROM and are generally focused in determining whether the contents of a particular off-processor memory location has been corrupted or damaged.

Fault-tolerant computing systems, by contrast, are generally focused on ensuring that software errors or hardware failures do not necessarily cause cessation of the computing processes. The systems utilize various redundancy schemes and hardware-oriented voting devices to trap erroneous calculations or system failures. Fault-tolerant computing systems may also include memory-focused error detection and/or correction schemes.

SUMMARY

Unfortunately, there are deficiencies to the above-described conventional approaches when applied to advanced high-speed computer processors. For example, the data loaded into processor registers as well as the results of processor operations placed into registers are not checked for integrity. If the register moves or other operations produce wrong results or corrupted data, bad information may be propagated to the computer system or to application software running on the system. Bad data may even cause processor operations to cease (i.e., a "crash"). The wrong results may also cause the application (or the operating system) to fail later on, leading to an interruption of service. In a more serious case, if the wrong results are silently propagated, data corruption may result leading to incorrect results but no visible indication of error. All of the above faults may or may not be visible to a user. Singly or together, however, the presence of these effects causes the reliability of the system to be doubted.

Prior methods of improving system reliability with fault-tolerant computing methods (such as double or triple modular redundancy systems in hardware, "multiple version" approaches in software, and the like) are known to be costly, as the replication of processing units and/or software computations requires extra resources. Additionally, such replication and/or majority voting schemes are also processor real estate intensive, in terms of the integrated circuit area and/or gate count. Moreover, in the case of software redundancy schemes, the additional processing often takes more time that is desirable in high-speed processing architectures.

Although certain number theory-based techniques (such as the Residue Number System [RNS]) have been suggested for use in error detection schemes, they are generally considered unable to provide on-board error detection in advanced processor architectures. In particular, previous techniques are too resource-intensive to be applied to processor register operations "on the chip" and have not been fast enough to operate without introducing unacceptable processing delays.

What is needed is a reliable and relatively inexpensive processor architecture that provides a high degree of confidence that register operations and computations are correctly executed. In particular, what is needed is an error detection scheme for determining whether the contents of registers within the processor are free of errors resulting from register moves or arithmetic operations.

In contrast to conventional approaches, embodiments of the present invention are directed to the use of digital roots, including hexadecimal digital roots (HDRs), for fast verification of register operations and moves. Embodiments of the invention obtain a hexadecimal digital root value by the recursive addition of the hexadecimal digits of each operand into a single nibble (i.e., a 4-bit half byte). Hexadecimal digital roots range from 0x0 to 0xF; thus, four bits can hold the hexadecimal digital root of an integer of any length. The error detecting qualities of HDR in arithmetic operations are the same as those of decimal digital roots (i.e., the digital root obtained by recursively adding the decimal digits of a number). Thus, a single or multi-bit error in a nibble will change the value of that nibble and result in a different HDR. However, as with digital roots, faults resulting in a nibble swap (analogous to a digit swap in a decimal number) will go undetected because the HDR will be unchanged. The probability of a nibble swap is proportionally lower, however, because multiple bits would have to be corrupted in order to effect such a swap.

Embodiments of the invention compute a hexadecimal digital root for the result of each register computation and compare this result to the results of the same computation performed on the HDRs of the operands. For example, as with the digital root, the sum of the hexadecimal digital roots of the operands is equal to the hexadecimal digital root of the result. Likewise, the 2's complement addition (i.e., subtraction) of one operand to another produces a result whose hexadecimal digital root is also the result of the 2's complement addition (i.e., subtraction) of the hexadecimal digital root of its operands. The same also holds true for multiplication and division.

One of the advantages of the hexadecimal digital root approach lies in the fact that embodiments of the invention can be implemented with combinatoric logic. Embodiments of the invention thus are able to perform execution of the HDR computations in a single clock cycle, so that there is no system delay or latency due to the HDR error checking circuits. This fortuitous result arises from the fact that embodiments of the invention compute hexadecimal digital roots bit-wise and, at the circuit level of the processor, the most readily accessible aspect of a value stored in a register is its individual bits. In other words, when the processor loads a number into a register, its bits are readily accessible and may be read directly from that register. Embodiments of the invention can then use carry look-ahead adders (CLAs) to sum the bits in a nibble and thus obtain the HDR for each nibble. As further described below, Embodiments of the invention can then recursively sum the nibble-level HDRs to determine the corresponding HDR for each register or operand.

Accordingly, the present system is capable of high-speed computation of HDRs as well as operand and/or register move result validation within a single processor cycle. Furthermore, the circuits and methods described herein have comparatively little impact on processor real estate, as compared to other fault-tolerant and/or redundancy schemes.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

The drawings are not necessarily to scale, emphasis instead being placed upon illustrating the principles of the invention.

DETAILED DESCRIPTION

Embodiments of the invention are directed to circuits and techniques for register integrity checking employing digital roots, and hexadecimal digital roots (HDRs) in particular, to verify the results of arithmetic operations and register moves within a computer processor and/or other arithmetic unit.

Figure 1:
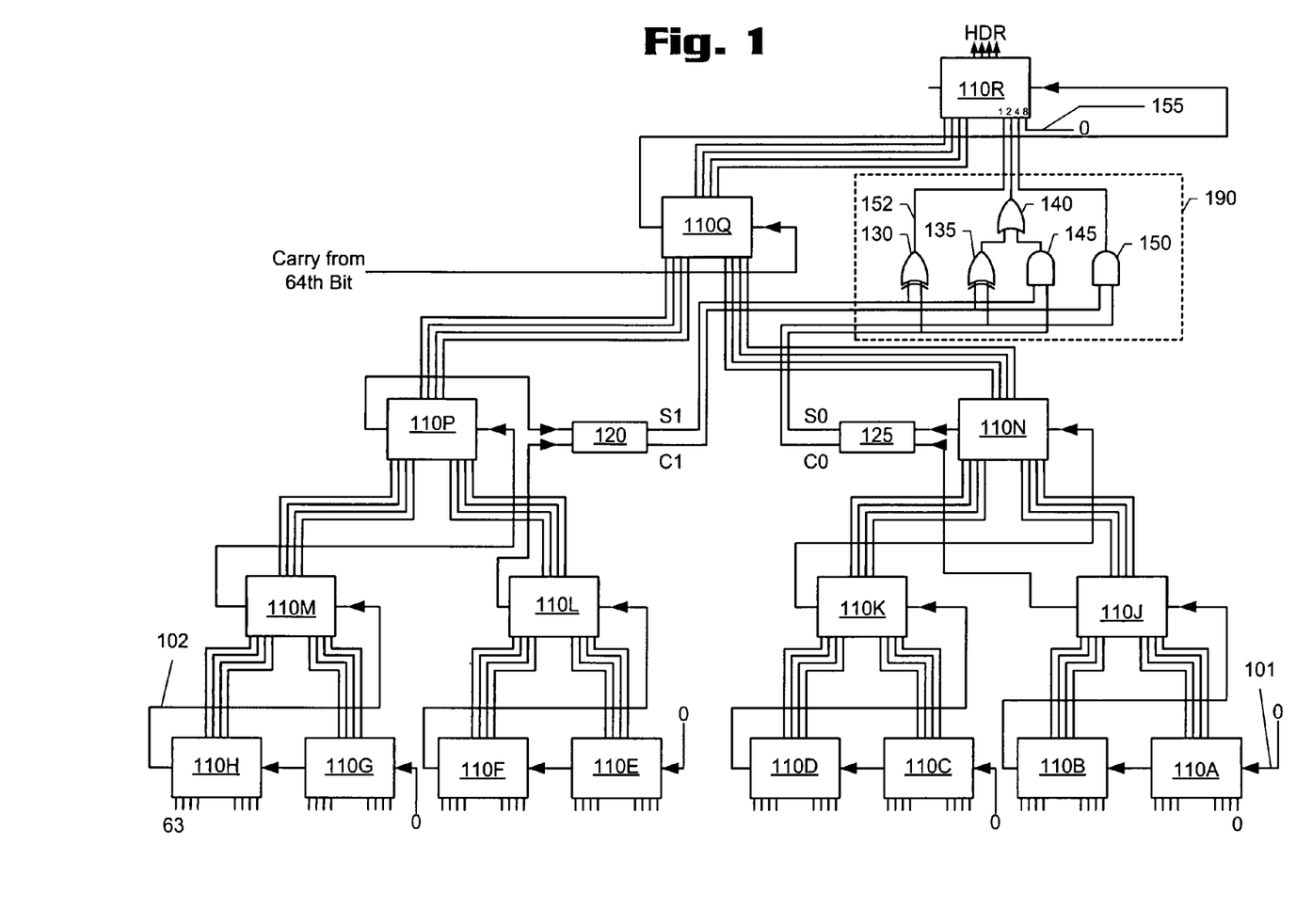
FIG. 1 is a high-level block diagram of a hexadecimal digital root (HDR) generation circuit according to one embodiment of the present invention.

The basic building block of the register integrity checking system is the digital root calculation (or generating) circuit. FIG. 1 illustrates a representative circuit embodiment of the invention configured of logic devices to generate the hexadecimal digital root corresponding to an input value. The most basic building block of the circuit is a carry look-ahead adder (CLA) 110. A CLA may be implemented in accordance with embodiments of the invention, for example, on an Altera field programmable gate array (FPGA) through programming means well-known in the art. Alternatively, the CLA function may also be implemented in discrete logic in a custom processor ASIC. The circuit of FIG. 1 contains a set of input adders 110A through 110H. Each of the input adders takes two 4-bit quantities and sums them together to produce a single 4-bit output and a carry bit. A first tier of cascading adders sums the other resulting sums from the input adders again, producing an intermediate set of sums and carry bits. In the exemplary circuit of FIG. 1, which is configured to perform a hexadecimal digital root function on a 64-bit input value, there are four intermediate sums and four carry bits.

Carry look-ahead adders 110N and 110P and half adders 120 and 125 are connected to the intermediate sums and carry bits in order to form a penultimate set of sums and carry bits for final resolution into the hexadecimal digital root. In order to recursively add the bits of 4-bit numbers, embodiments of the invention continuously add back in the carry bits resulting from each sum operation. Half adders 120 and 125, as well as XOR gates 130 and 135, AND gates 145 and 150, and OR gate 140 provide the logic to sum in the carry bits at CLA 110R. Thus, the output of CLA 110Q (including, when present, the carry from the $64^{th}$ input bit) and the result of carry bit summation logic gates 130, 135, 140, 145, and 150 (together referred to as combinational logic element 190) are summed together in CLA 110R to form the final hexadecimal digital root. In particular, the output of XOR gate 130 (signal 152) is connected to the high order bit of the right-hand input to CLA 110R. The high order bit (i.e., in the "8" position) of that input (signal 155) is tied to logic "0."

The logical relationships that that determine the connections between half adders 120 and 125, XOR gates 130 and 135, AND gates 145 and 150 and OR gate 140 are further explained by reference to FIG. 5. From FIG. 2, one of ordinary skill in the art will recognize that half adder 120 generates the high order sum bit (designated S1) and the high order carry bit (C1). Half adder 125 generates the low order sum bit (S0) and low order carry bit (C0). These signals, designated as S0, C0, S1, and C1, feed into combinational logic element 190 to determine the bit position-weighted value input to top-level CLA 110R.

Figure 5A:
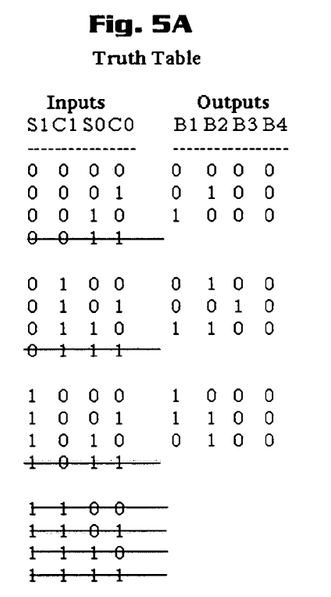
FIG. 5A illustrates the logic tables for the inputs and outputs of combinational logic 190, according to one embodiment of the present invention.

FIG. 5A illustrates, in the form of truth tables, all of the valid inputs to and outputs from combinational logic 190. Outputs B1 through B4 represent the right hand inputs to top-level CLA 110R, output bit B1 being the lowest order input bit and output B4 being the highest order input bit.

Figure 5B:
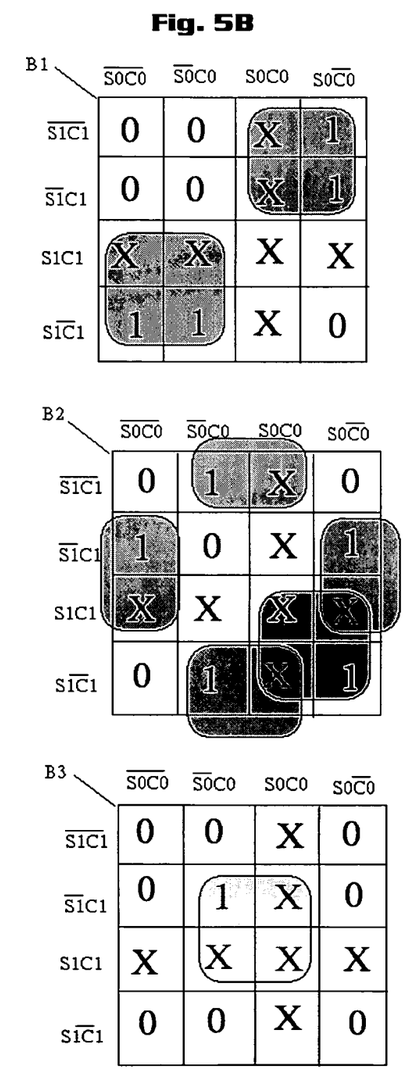
FIG. 5B illustrates the Karnaugh maps of the inputs and outputs of combinational logic 190, according to one embodiment of the present invention.
Figure 5C:
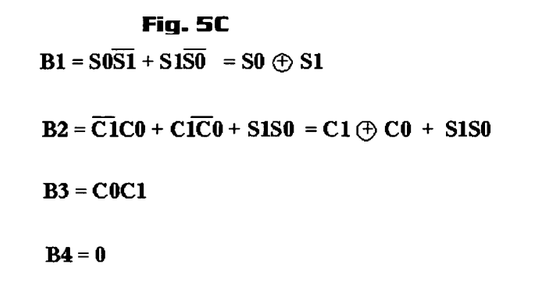
FIG. 5C illustrates the logical relationships between the inputs and outputs of combinational logic 190, according to one embodiment of the present invention.

FIG. 5B illustrates the Karnaugh maps for outputs B1 through B3. Since the output bit B4 is zero in all cases (i.e., for all inputs), no map for bit B4 is required. Deriving the logic functions for each bit B1 through B3 from the Karnaugh maps proceeds according to methodologies well-known in the art, and produces the combinational logic equations shown in FIG. 5C. These relationships are implemented in combinational logic element 190.

Figure 2:
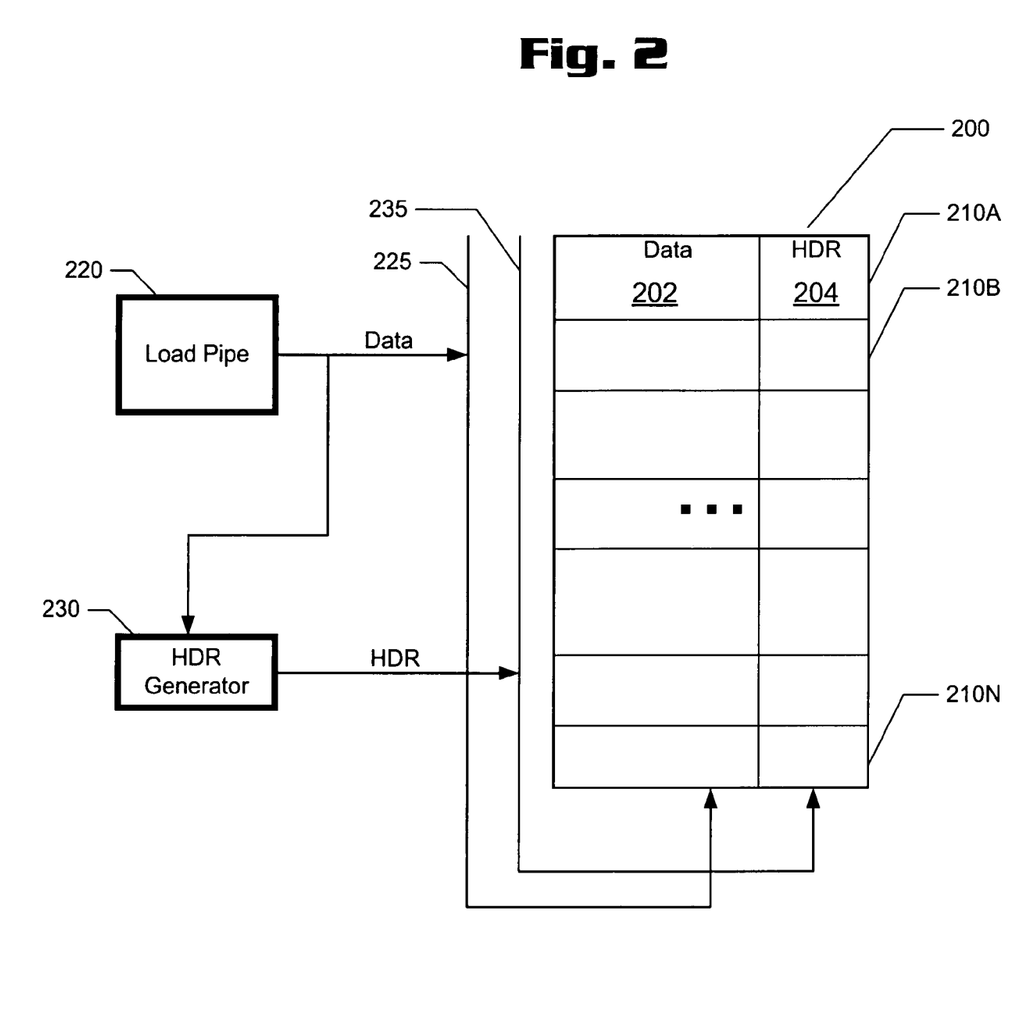
FIG. 2 is a high-level block diagram of a processor register file according to one embodiment of the present invention.

FIG. 2 illustrates a high-level schematic of a processor register file (or logical register space) 200, according to one embodiment of the present invention. For illustrative clarity, timing, control, and power lines are not shown. Register data 202 is stored conventionally into each register 210. Stored alongside and associated with each register value 202 is the pre-computed hexadecimal digital root 204 for each register value 202. Load pipe 220 represents the conventional circuits (including control circuits) used to load data into and read data from registers 210. HDR generator circuit 230 is shown configured to read each data value 202 as it is placed into register 210 on bus 225 and to compute the value's HDR. The HDR is then placed on HDR bus 235 and stored in the appropriate register 210.

HDR generator 230 may be implemented, in some embodiments, via the high-level schematic shown in FIG. 1. One of ordinary skill in the art will appreciate the fact that word lengths used in processors have evolved from simpler 4- and 8-bit schemes to the more current 32-, 64-, and 128-bit (or larger) systems. Accordingly, the word lengths upon which HDR generator 230, register file 200, and the corresponding bus circuits operate may vary from implementation to implementation. The present invention is not limited to any particular word length; the register files and the combinatoric logic used to compute a digital sum may be adapted to any word length by one of ordinary skill in the art without undue experimentation.

In an alternate embodiment of the register file system illustrated in FIG. 2, the HDR generator 230 is configured to read the output from registers 200. In such an embodiment, the HDR 204 is not stored with each register value 202, but rather it is computed on the fly by a dedicated HDR generator as each value 202 is read out of the register file 200.

Figure 3:
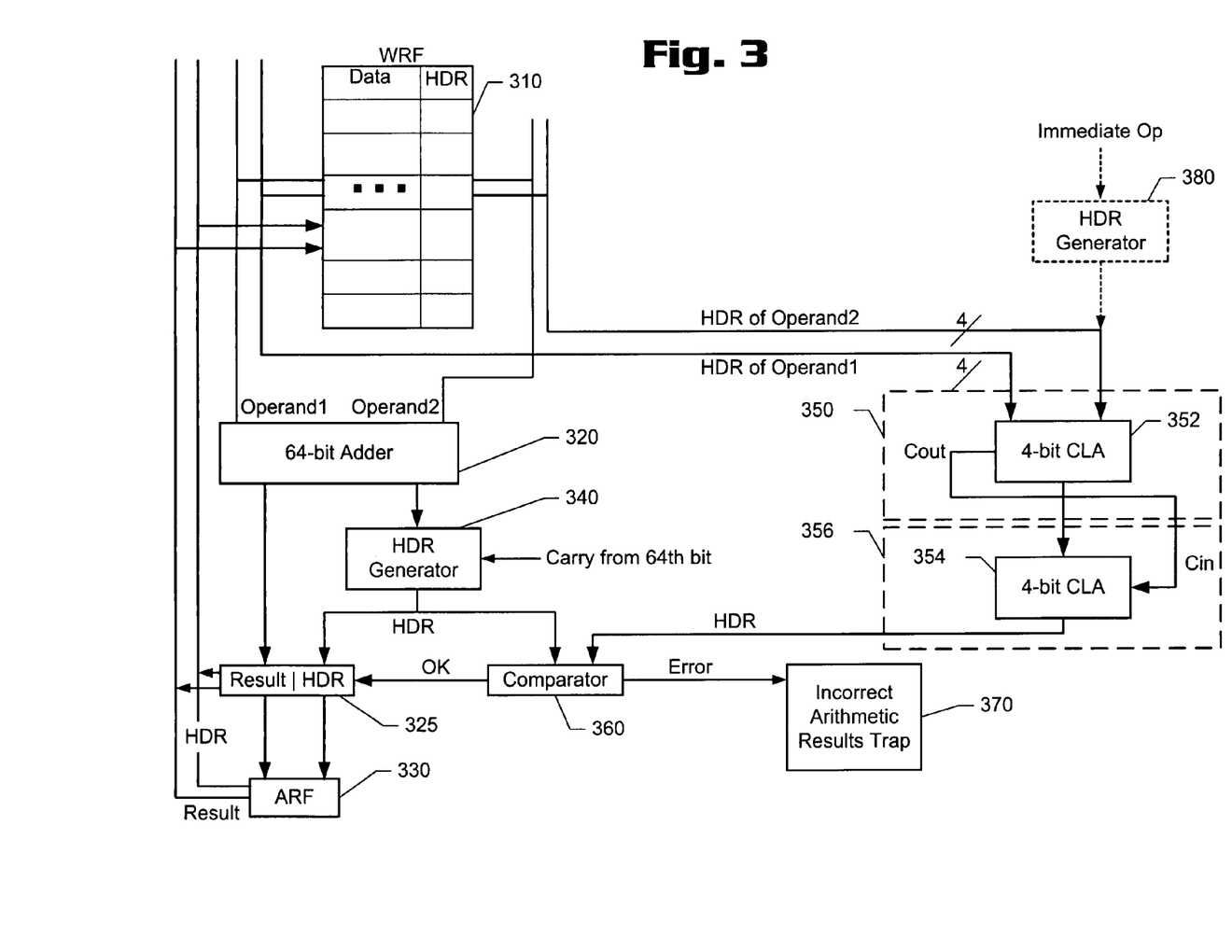
FIG. 3 is a high-level block diagram of an integer adder with HDR checking according to one embodiment of the present invention.

FIG. 3 illustrates a high-level schematic of an error detection apparatus employing hexadecimal digital roots to verify the results of an arithmetic operation in a processor. Processor working register file (WRF) 310 is shown with the HDR for each data value stored alongside that value. As discussed above, this is but one of several alternate embodiments for a processor register file for use in accordance with the present teachings. For example, in one alternate embodiment, a separate HDR generation circuit, such as that described above with reference to FIG. 1, may be located outside of register file 310.

In FIG. 3, two operands are selected from working register file 310 under processor control. These operands, designated Operand1 and Operand2, are input to a first operation circuit 320, in this example a 64-bit adder. (Adder 320 represents but one possible implementation of a first operation circuit, i.e., a circuit performing an operation on one or more values from WRF 310.) The result of this first operation is fed to two locations: result register 325 and HDR generator 340. HDR generator 340 computes the HDR of the results of operation 320 and stores that result HDR in result register 325, alongside the result of the operation. As noted above with respect to FIG. 1, when present the carry from the $64^{th}$ bit of the result of operation 320 is also used by HDR generator 340.

At substantially the same time that operation 320 is in progress, the HDRs of Operand1 and Operand2 are processed by a second operations circuit 350. In the particular embodiment exemplified by FIG. 3, in which addition is the subject operation, the 4-bit HDRs are added by a 4-bit CLA 352. The results of this addition, including the carry bit Cout, are then summed by 4-bit CLA 354. The summation of CLA 354 is in fact an HDR calculation on the results of operations circuit 350; accordingly the function perform by CLA 354 may be referenced generally as HDR generator 356.

The result HDR (formed by HDR generator 340) and the check HDR (formed by HDR generator 356) are compared in checker or comparator 360. The results of this comparison operation in checker 360 determine whether an error has occurred: if the as discussed above, if the two HDRs match, then the arithmetic operation was performed correctly. However, if the result of the comparison indicates a mismatch, then there has been an error. Thus, the comparator 360 may be configured to output an error flag whose value is logic "1" when the result HDR and the check HDR do not match, thus forming an error flag.

If an error has been detected by comparator 360, the error flag may then be passed to incorrect arithmetic result trap 370 for further processing, according to conventional means well-known in the art. Such processing may include, but is not limited to, signaling an error to the operating system or to the user, or forcing a recomputation.

If comparator 360 does not indicate an error, the contents of result register 325 may then be passed to working register file 310 for use by the controlling program according to conventional means. In some embodiments, this value may pass through an architecture register file (ARF) 330.

It is important to note that all the circuits illustrated in FIG. 3 are combinatoric. No additional timing or clocking is required to perform the HDR generation, HDR operations (in second operations circuit 350), or error detection in comparator 360. The necessary circuits and logic are designed, through conventional circuit means, to operate in parallel with first operation circuit 320. No additional latency or delay results from the computation of the HDRs for the comparison of the result HDR to check HDR, enabling error detection with no loss of processor speed or throughput efficiency.

First operation circuit 320 and second operation circuit 350 are illustrated in FIG. 3 as adders. One of ordinary skill in the art will recognize that, because of the error correcting capabilities of the digital root method, these operations are not limited to addition only. Any arithmetic operation, such as, but not limited to, addition, subtraction, multiplication, or division, may be validated by the digital root method. Accordingly, the operation to be performed is not limited solely to addition. In fact, first operation circuit 320 and second operation circuit 350 may be replaced by any conventional arithmetic circuit. The primary difference between first operation circuit 320 and second operation circuit 352 is that second operation circuit 352 need only operate on 4-bit operands, since the HDR of Operand1 and the HDR of Operand2 are each only 4-bit numbers.

In case of a unary or immediate operation, only a single register value is supplied to first operation circuit 320. At substantially the same time, the HDR value for that single register operand is passed directly to second operation circuit 350. If this operand does not have a pre-computed HDR stored with it, HDR generator 380 may be used to compute its HDR. As is well understood by those of ordinary skill in the art, a unary operation (such as a register copy or register move) affects only a single value. The validity of such an operation may still be validated by the digital root technique as discussed above. Consequently, if the digital root of the operand computed before the unary operation fails to match the digital root of the results of the unary operation, an error may be flagged.

Figure 4:
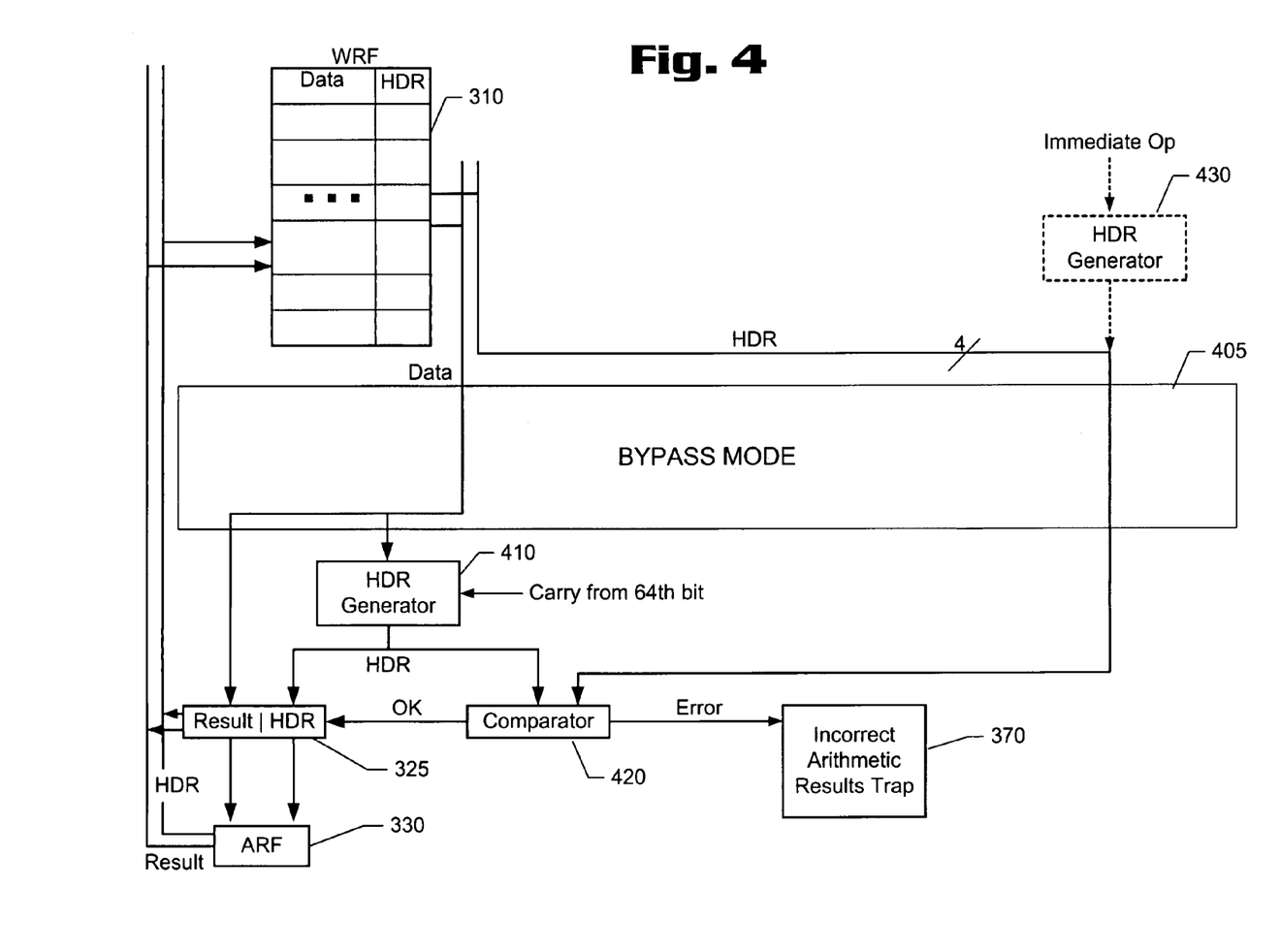
FIG. 4 is a high-level block diagram of a register integrity checking circuit employing HDR verification according to one embodiment of the present invention.

This latter situation is illustrated schematically (at a high-level) in FIG. 4. Bypass mode circuit 405 represents configurable logic that allows a circuit such as that illustrated in FIG. 3 to pass a unary operand directly to an HDR generator 410. In such an embodiment, comparator 420 thus compares the output HDR generator 410 (representing the HDR after a register move or other unary operation) with the HDR of the register prior to such an operation. As noted above, if the "prior to" value does not have a pre-computed HDR associated with it, an HDR generator 430 may be used.

While this invention has been particularly shown and described with references to embodiments thereof, it will be understood by those skilled in the art that various changes in form and details may be made without departing from the spirit and scope of the invention as defined by the appended claims.

I claim:

1. A method of error detection in a computer processor having a plurality of memory elements, comprising:
    computing a base digital root (DR) for each memory element having a value stored therein to form a corresponding base DR;
    performing an operation on one or more of said memory elements to form a result;
    performing said operation on one or more of said corresponding base DRs to form a check value;
    computing a result DR of said result;
    comparing said result DR to said check value; and
    signaling an error based on said comparing, wherein said computing a base DR and said computing a result DR each comprise: operating a set of input adders, each configured to add two 4-bit inputs and each configured to produce a single 4-bit output and a carry bit, and
    operating a set of cascade adders operably connected to said 4-bit outputs and said carry bits of said set of input adders and configured to add said 4-bit outputs and said carry bits to produce the HDR of all of said 4-bit inputs without a carry bit,
    wherein said set of input adders and said set of cascade adders operate combinatoricly.

2. The method of claim 1, wherein said base DR is a hexadecimal digital root and said result DR is a hexadecimal digital root.

3. The method of claim 1, wherein said performing an operation comprises any of the operations of adding, subtracting, integer multiplying, integer dividing, floating point multiplying and floating point dividing.

4. The method of claim 1, further comprising storing said corresponding base DR with each said memory element.

5. A circuit apparatus for detecting errors in computer processor registers, comprising:
    a first operation circuit operably connected to one or more of said registers and producing a first result;
    one or more first hexadecimal digital root (HDR) circuits each operably connected to one of said registers, each producing a HDR for each said register;
    a second operation circuit operably connected to said one or more first HDR circuits and producing a second result;
    a second HDR circuit operably connected to said first operation circuit, receiving said first result and producing a result HDR;
    a third HDR circuit operably connected to said second operation circuit, receiving said second result and producing a check HDR; and
    a comparator operably connected to said second HDR circuit and said third HDR circuit, configured to compare said result HDR and said check HDR and producing an error flag, wherein said error flag indicates an error in said first operation circuit, wherein said first, second, and third HDR circuits each comprise:
        a set of input adders, each configured to add two 4-bit inputs and each configured to produce a single 4-bit output and a carry bit, and
        a set of cascade adders operably connected to said 4-bit outputs and said carry bits of said set of input adders and configured to add said 4-bit outputs and said carry bits to produce the HDR of all of said 4-bit inputs without a carry bit,
        wherein said set of input adders and said set of cascade adders operate combinatoricly.

6. The circuit apparatus of claim 5, wherein said first and second operation circuits perform the same operation, said operation selected from the group consisting of addition, subtraction, multiplication, division, and copying.

7. The circuit apparatus of claim 5, wherein said HDR for each said register is stored with said register contents.

8. The circuit apparatus of claim 5, wherein said first, second, and third HDR circuits are substantially identical.

9. The circuit apparatus of claim 5, wherein said set of input adders comprises eight adders.

10. The circuit apparatus of claim 5, wherein said set of input adders comprises sixteen adders.

11. The circuit apparatus of claim 5, wherein said set of cascade adders comprises:
    a first tier of adders configured to sum said 4-bit outputs and said carry bits from said set of input adders into an intermediate set of sums and carry bits;
    a second tier of adders configured to sum said intermediate set of sums and carry bits into a plurality of penultimate sums and carry bits;
    a logic circuit configured to sum said plurality of penultimate sums and carry bits into a hexadecimal digital root.

12. The circuit apparatus of claim 11, wherein said first tier of adders comprises eight 4-bit carry look-ahead adders.

13. The circuit apparatus of claim 11, wherein said first tier of adders comprises sixteen 4-bit carry look-ahead adders.

14. An apparatus for error detection in a computer processor having a plurality of memory elements, comprising:
    circuit means for computing a base digital root (DR) for each memory element having a value stored therein to form a corresponding base DR,
    circuit means for performing an operation on one or more of said memory elements to form a result;

circuit means for performing said operation on one or more of said corresponding base DRs to form a check value;

circuit means for computing a result DR of said result;

circuit means for comparing said result DR to said check value; and circuit means for signaling an error based on said comparing, wherein said circuit means for computing a base DR and said circuit means for computing a result DR each comprise:

circuit means for operating a set of input adders, each configured to add two 4-bit inputs and each configured to produce a single 4-bit output and a carry bit, and circuit means for operating a set of cascade adders operably connected to said 4-bit outputs and said carry bits of said set of input adders and configured to add said 4-bit outputs and said carry bits to produce the HDR of all of said 4-bit inputs without a carry bit, wherein said set of input adders and said set of cascade adders operate combinatoricly.

15. The apparatus of claim 14, wherein said base DR is a hexadecimal digital root and said result DR is a hexadecimal digital root.

16. The apparatus of claim 14, wherein said circuit means for performing an operation comprises any of:
an adder;
a multiplier; and
a floating point multiplier.

17. The apparatus of claim 14, wherein said circuit means for performing an operation comprises means for moving the value in one of said memory elements into another said memory element.

18. A computer system, comprising:
memory elements;
and a processor performing the steps of:

computing a base digital root (DR) for each memory element having a value stored therein to form a corresponding base DR;

performing an operation on one or more of said memory elements to form a result;

performing said operation on one or more of said corresponding base DRs to form a check value;

computing a result DR of said result;

comparing said result DR to said check value; and signaling an error based on said comparing, wherein said computer instructions for computing a base DR and said computer instructions for computing a result DR each comprise:

computer instructions for operating a set of input adders, each configured to add two 4-bit inputs and each configured to produce a single 4-bit output and a carry bit, and computer instructions for operating a set of cascade adders operably connected to said 4-bit outputs and said carry bits of said set of input adders and configured to add said 4-bit outputs and said carry bits to produce the HDR of all of said 4-bit inputs without a carry bit, wherein said set of input adders and said set of cascade adders operate combinatoricly.

19. The computer system of claim 18, wherein said base DR is a hexadecimal digital root and said result DR is a hexadecimal digital root.

20. The computer system of claim 18, wherein said performing an operation comprises any of the operations of adding, subtracting, integer multiplying, integer dividing, floating point multiplying and floating point dividing.

21. The computer system of claim 18, further comprising computer instructions for storing said corresponding base DR with each said memory element.

* * * * *